AUTOMATIC FREQUENCY CONTROL SYSTEM

Filed Oct. 19, 1945 2 Sheets-Sheet 1

INVENTOR.
GEORGE H. NIBBE
BY
William D. Hall
ATTORNEY

AUTOMATIC FREQUENCY CONTROL SYSTEM

Filed Oct. 19, 1945 2 Sheets-Sheet 2

*INVENTOR.*
GEORGE H. NIBBE
*BY* William D. Hall
*ATTORNEY*

Patented June 26, 1951 2,558,371

UNITED STATES PATENT OFFICE 2,558,371

AUTOMATIC FREQUENCY CONTROL SYSTEM

George H. Nibbe, Concord, Mass., assignor, by mesne assignments, to the United States of America as represented by the Secretary of War Application October 19, 1945, Serial No. 623,389

5 Claims. (Cl. 250—36)

This invention relates in general to radio apparatus and more specifically to a system for automatic frequency stabilization of oscillators and similar apparatus.

In many types of radio object-locating devices it is necessary to control the frequency of local oscillators so that the intermediate frequency, resulting from mixing the output of the local oscillator with the signal, will be constant. The frequency of the local oscillator tends to change because of load and temperature variations and other factors. It is sometimes desirable to change the frequency of the signal, thereby necessitating a change in frequency of the local oscillator so that the intermediate frequency will remain the same as before. The change in local oscillator frequency must be a rapid one, as in many radio object-locating devices the signal consists of recurring pulses of extremely short duration. When the local oscillator is producing an output of such a frequency that the resulting intermediate frequency does not have the desired value, a complete signal pulse or chain of pulses may be lost by attenuation unless an immediate correction of the local oscillator frequency is made.

It is an object of this invention to provide a means which will automatically stabilize the frequency of a local oscillator.

A further object is to provide a means for stabilizing an I.-F. voltage. Another object is to provide a means to control the frequency of an oscillator and to provide a second means which, should said first means fail to control said oscillator, will place said first means in condition to control the frequency of said oscillator.

Generally, this invention consists of a discriminator connected to a trigger circuit. The output voltage of the trigger circuit is large or small, depending upon which tube of the trigger circuit is conducting. The output voltage of said trigger circuit is used to control a second trigger circuit. The output voltage of said second trigger circuit is used to change the freqeuncy of the oscillator.

During normal operation with control established, said first trigger circuit alternates rapidly between its two stable conditions causing said second trigger circuit to alternate rapidly between its two stable conditions. If, however, control is lost, the output voltage will be constant; and, after a specified time, a pulsing circuit operates to change the magnitude of the output of said second trigger circuit to again restore the oscillator to the proper frequency.

Figure 1:
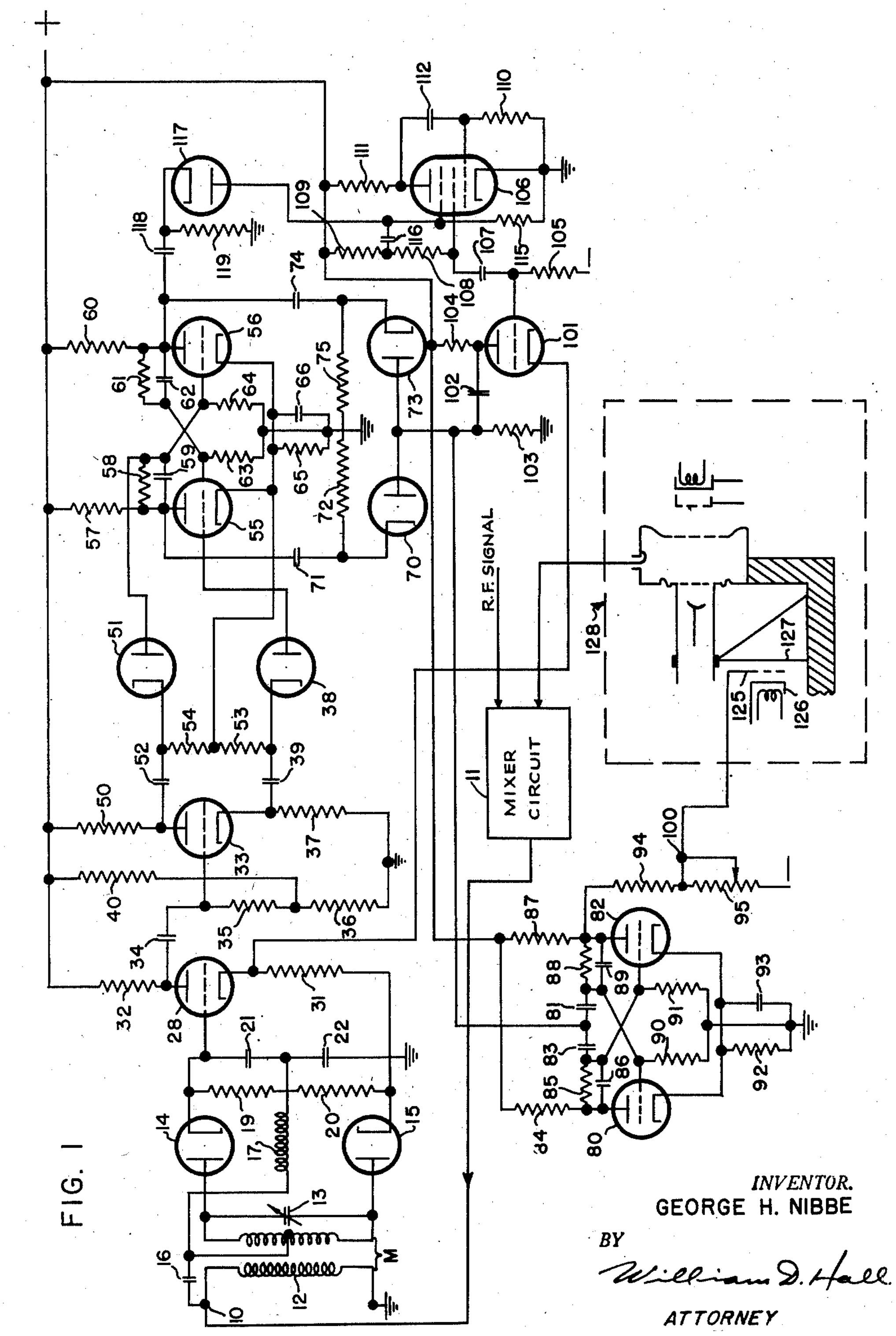
Figure 2:
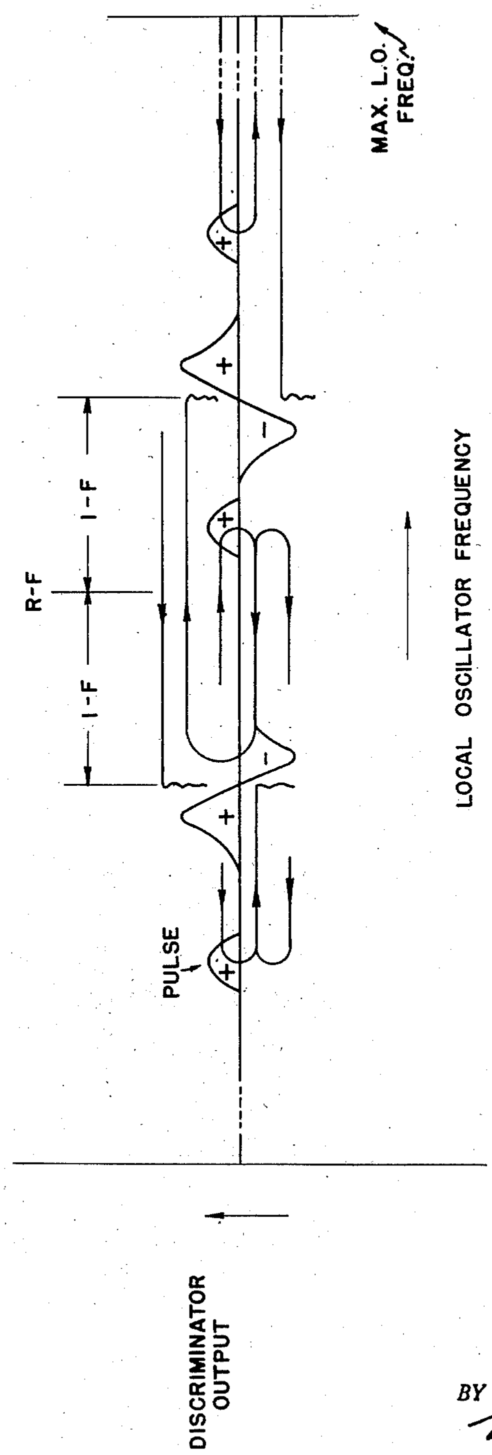

Other objects, features and advantages of this invention will suggest themselves to those skilled in the art and will become apparent from the following description of the invention taken in connection with the accompanying drawings in which:

Fig. 1 is a circuit diagram illustrating the principles embodied in this invention; and Fig. 2 is a chart which shows the relation between the local oscillator frequency and discriminator output, and also illustrates the possible variations in the local oscillator frequency when it is not held at a fixed frequency by the control circuit.

Referring now more particularly to Fig. 1, mixer circuit 11 is connected to input terminal 10 of the primary of a transformer 12. The secondary of transformer 12 is connected across a capacitor 13 and its terminals are connected to the plates of diodes 14 and 15, respectively. Terminal 10 is also connected through a capacitor 16 to a center tap of the secondary of transformer 12 and to one side of a choke 17. The cathodes of diodes 14 and 15 are connected together by resistors 19 and 20 in series. Capacitors 21 and 22 are also connected in series between the cathodes of tubes 14 and 15. The junction of resistors 19 and 20 is connected to the junction of capacitors 21 and 22 and also to the choke 17. The cathode of tube 15 is grounded.

The cathode of the tube 14 is connected to the grid of a tube 28. The cathode of tube 28 is connected to ground through a resistor 31. The plate of tube 28 is connected to a source of positive potential (not shown) through a resistor 32. The plate of tube 28 is also connected to the grid of a tube 33 through a capacitor 34. The grid of tube 33 is grounded through resistors 35 and 36 which are connected in series. The junction of resistors 35 and 36 is connected to a positive potential source through a resistor 40. The cathode of tube 33 is connected to ground through a resistor 37 and to the cathode of a diode tube 38 through a capacitor 39. The plate of tube 33 is connected to a source of positive potential through a resistor 50 and to the cathode of a diode tube 51 through a capacitor 52. The cathodes of tubes 38 and 51 are connected together by resistors 53 and 54 which are connected in series. The plate of tube 38 is connected to the grid of a tube 55; similarly the plate of tube 51 is connected directly to the grid of a tube 56.

The plate of tube 55 is connected to a positive potential source through a resistor 57 and to the grid of tube 56 through a resistor 58 and a capacitor 59 in parallel. Similarly, the plate of tube 56 is connected to a positive potential source through a resistor 60 and to the grid of tube 55 through a resistor 61 and a capacitor 62 in parallel. The grid of tube 55 is connected to ground through a resistor 63 and the grid of tube 56 is connected to ground through a resistor 64. The cathodes of tubes 55 and 56 are connected together and to the junction of resistors 53 and 54. The cathodes of tubes 55 and 56 are connected to ground through the parallel combination of a resistor 65 and a capacitor 66.

The plate of tube 55 is connected to the cathode of a tube 70 through a capacitor 71. The cathode of tube 70 is also connected to ground through a resistor 72. Similarly, the plate of tube 56 is connected to the cathode of a tube 73 through a capacitor 74. The cathode of tube 73 is connected to ground through a resistor 75. The plates of tubes 70 and 73 are connected together, and their junction is connected to the grid of a tube 80 through a capacitor 81 and to the grid of a tube 82 through a capacitor 83.

The plate of tube 80 is connected to a positive potential source through a resistor 84 and to the grid of tube 82 through the parallel combination of a resistor 85 and a capacitor 86. Similarly, the plate of tube 82 is connected to a positive potential source through a resistor 87 and to the grid of tube 80 through the parallel combination of a resistor 88 and a capacitor 89. The grid of tube 80 is connected to ground through a resistor 90 and the grid of tube 82 is connected to ground through a resistor 91. The cathodes of tubes 80 and 82 are connected together and to ground through the parallel combination of a resistor 92 and a capacitor 93. A further connection from the plate of tube 82 is made to a negative potential source (not shown) through a resistor 94 and a potentiometer 95 in series. The junction of resistor 94 and potentiometer 95 is connected to the movable contact of potentiometer 95 and to an output terminal 100.

The plates of tubes 70 and 73 are connected to the plate of a tube 101 through a capacitor 102 and also to ground through a resistor 103. A connection is made from the cathode of tube 101 to the cathode of tube 28. The plate of tube 101 is connected to a positive potential source through a resistor 104. The grid of tube 101 is connected to a negative potential source through a resistor 105 and to the screen grid of a thyratron tube 106 through a capacitor 107. The screen grid of tube 106 is also connected to a positive potential source through resistors 108 and 109 in series. The cathode of tube 106 is grounded and the control grid is grounded through a resistor 110. The plate of tube 106 is connected to a source of positive potential through a resistor 111 and also to the control grid of tube 106 through a capacitor 112. The suppressor of tube 106 is connected to ground through a resistor 115. The suppressor of tube 106 is also connected through a capacitor 116 to the junction of resistors 108 and 109. A further connection is made from the suppressor of tube 106 to the plate of a tube 117. The cathode of tube 117 is connected through a capacitor 118 to the plate of tube 56. The cathode of tube 117 is also connected to ground through a resistor 119.

Output terminal 100 is connected to a grid 125 which controls the electron flow from a cathode 126 to a strut 127 connected to the cavity resonator of an oscillator tube 128. Strut 127 is heated by the current passing through it and is arranged to expand or contract with changes in temperature. Expansion or contraction of strut 127 alters the tuning of the cavity resonator and changes the frequency of the oscillator.

In operation, the I.-F. voltage whose frequency is to be controlled is applied across the primary winding of transformer 12. This I.-F. voltage is obtained by heterodyning a radio-frequency voltage with the local oscillator voltage in the mixer circuit 11. Diodes 14 and 15, operating in conjunction with the associated apparatus, produce a voltage output, the polarity and magnitude of which are functions of the discrepancy of the frequency of the incoming voltage in relation to the frequency of the tuned circuit consisting of transformer 12 and capacitor 13. This is conventional discriminator action, the operation of which is explained, for example, on pages 585, 586 and 587 of the "Radio Engineer's Handbook" by F. E. Terman, published by McGraw-Hill Book Company, Inc., in 1943.

The output of the frequency discriminator is amplified by tube 28 and applied to the grid of tube 33. Tube 33, in combination with resistors 37 and 50, acts as a phase splitter producing approximately equal voltages, but of opposite polarity, at its plate and cathode. The voltages produced at the plate and cathode of tube 33 are applied to the grids of tubes 56 and 55, respectively. These voltages are preferably applied through diodes 51 and 38, as indicated, to insure proper operation of the circuit which follows. Tubes 55 and 56 and associated apparatus operate as a trigger circuit. Said trigger circuit has two stable positions and when once triggered by a pulse of one polarity, it is insensitive to pulses of the same polarity and does not "flip over" until triggered by a pulse of opposite polarity.

Voltage outputs are taken from the plates of tubes 55 and 56 and are applied to the grids of tubes 80 and 82, preferably through diodes 70 and 73 as indicated in Fig. 1. Tubes 80 and 82 and associated apparatus operate as a second trigger circuit which is of such a nature that it flips over when excited by a pulse of either polarity. The output of this circuit determines the potential applied to the grid of the local oscillator's tuning element.

Tube 106 operates as a pulser. It is controlled, that is, prevented from pulsing, by the action of tube 117 and associated apparatus. The output of the pulser tube 106 is taken from its screen grid and applied to the grid of tube 101. The positive pulse applied to tube 101 from the pulser is applied to tube 28 by cathode follower action, as the cathode resistor 31 is not bypassed. Said positive pulse appearing on the cathode tube 28 insures that the trigger circuit composed of tubes 55 and 56 is in the proper stable condition, that is, with tube 56 conducting. Furthermore, the positive pulse on the grid of tube 101 appears as a negative pulse on the plate of tube 101 and is applied to the grids of tubes 80 and 82, thereby pulsing the trigger circuit composed of tubes 80 and 82, causing it to flip over, that is to start the previously non-conducting tube conducting and to cut off the previously conducting tube, thereby altering the output voltage.

The operation of the pulser consisting of tube 106 and connected apparatus is such that the suppressor thereof is normally at a potential low enough to prevent plate current. The low voltage on the suppressor is present when the trigger circuit composed of tubes 55 and 56 is rapidly changing between its two stable conditions. This action causes a pulsing voltage to appear on the cathode of tube 117. When the potential drops on the cathode of tube 117, this tube will conduct, thereby charging capacitor 116. Capacitor 116 discharges slowly when the voltage on the cathode of tube 117 is high. The charging time constant of capacitor 116 is much shorter than its discharge time constant, thus producing a low potential on the suppressor grid of tube 106, when the trigger circuit is rapidly changing between its two stable conditions. When the trigger circuit is in one of its two stable conditions, capacitor 116 will discharge, after a predetermined interval of time, thus causing plate current to flow in tube 106 and the voltage on the plate will drop. This drop is applied to the grid of tube 106, by capacitor 112, thus causing its potential to drop. This action reduces the screen current, thus causing the screen voltage to rise. This rising screen voltage is applied to the suppressor by capacitor 106. The action is thus cumulative, causing the pulse to have a steep leading edge. The plate current of tube 106 will increase to a predetermined point due to plate saturation, that is, with most of the plate voltage appearing across resistor 111. The grid of tube 106 will rise as capacitor 112 discharges. This causes the screen current to increase; thus the screen voltage drops and a portion of this voltage drop is applied to suppressor grid causing the plate current to stop. If no signal has appeared on tube 117, capacitor 116 will charge and after a predetermined interval of time the cycle will repeat, that is, the pulser is free-running unless tube 117 conducts.

Normally, a pulse-shaped signal, composed of radio-frequency oscillations, is heterodyned with a local oscillator frequency to produce an intermediate frequency. The function of this invention is to cause the local oscillator frequency to be of such a value that the aforementioned intermediate frequency will be constant. The intermediate frequency is applied to the discriminator, which is so tuned that no output voltage is obtained when said intermediate frequency is of proper value. A variation in the intermediate frequency from the proper value will cause an output to be produced from the discriminator, thus pulsing the trigger circuit composed of tubes 55 and 56. The trigger circuit in turn produces a pulse which is applied to a second trigger circuit. The output of the second trigger circuit thus varies in magnitude as a function of the deviation of the intermediate frequency from the desired value. The output from said second trigger circuit is used to cause the strut in the local oscillator tube to expand and contract, thus changing the resonant frequency of the local oscillator.

When the discriminator indicates that the intermediate frequency is low the circuit operates to cause the local oscillator to change its frequency, thus raising the intermediate frequency. Similarly, when the discriminator indicates that the intermediate frequency is high, the circuit operates to cause the local oscillator to change its frequency, thus lowering the intermediate frequency.

Should the intermediate frequency sufficiently differ from the desired value that the discriminator will not produce a voltage output, the trigger circuits will remain in a stable condition until the pulser produces a voltage output to alter the conditions. If tube 56 is conducting when the pulser produces an output voltage, no change will occur in the trigger circuit composed of tubes 55 and 56. However, the voltage output from the pulser will cause the trigger circuit, composed of tubes 80 and 82, to flip over, that is, the non-conducting tube will conduct and the conducting tube will be cut off. This action will reverse the direction in which the local oscillator frequency is changing.

Referring now to Fig. 2, the action of a circuit as described above will be explained. In Fig. 2, the discriminator output is represented as a function of a local oscillator frequency and the possible paths through which the local oscillator may search in the process of getting to one of the sidebands produced by the discriminator are shown. The output of the pulser circuit appears in Fig. 2 as a positive pulse, as it will effectively be a positive pulse when applied to the trigger circuit composed of tubes 55 and 56. Further, the convention is assumed that a search path shall be drawn above or below the zero discriminator axis depending upon whether the trigger circuit composed of tubes 55 and 56 is sensitive to positive or negative signals, respectively.

It will be noted that the discriminator has an output over a relatively small portion of a local oscillator frequency range. In one type of thermally controlled local oscillator tube, the frequency of oscillations is highest when the tuning strut is cold and decreases as the tuning strut is heated. Depending upon whether tube 80 or 82 is conducting, the local oscillator frequency will decrease or remain substantially constant when the apparatus is initially turned on. If the frequency of the local oscillator starts to decrease, it will do so until it comes within the range of the discriminator, at which time it will be stabilized, that is, held within the "trap" of the discriminator, or until the pulser causes the trigger circuit to operate. The latter action would cause the local oscillator frequency to reverse its direction of variation and return to the frequency from which it started. It would then remain at that frequency until a second pulse was produced by the pulser, at which time the frequency would decrease to come under the control of the discriminator. The interval of time between pulses coming from the pulser is made to be greater than the time required for the local oscillator to sweep from one end of its frequency range to the desired frequency. Fig. 2 illustrates these paths of frequency sweep. If for any reason the discriminator loses control, a minimum amount of search time is required to re-establish the control.

The local oscillator might logically appear at a point travelling away from the desired sideband region in search of a positive pulse to cause it to return to the desired frequency. After a predetermined time, determined by the pulser circuit, the pulse will be produced, producing the desired effect upon the trigger circuits.

It will be noted that when a local oscillator is above or below the two side bands and searching towards a discriminator trap, it first will encounter a positive pulse from the discriminator. As the pulser circuit has made the trigger circuit, composed of tubes 55 and 56, insensitive to positive pulses, the local oscillator will continue to search through the positive portion of the side bands until it encounters a negative pulse, at which time it will be held within the trap produced by the discriminator and accompanying apparatus.

The search paths between the two side bands are also shown in Fig. 2. The longest possible path that the local oscillator may search is seen to be twice the time required for the local oscillator to drift from one side band to the other. This necessitates that the time between pulses of greater than twice the time required for the local oscillator to drift from one side band to the other.

While there has been herein described what is at present considered to be the preferred embodiment of this invention, it will be obvious to those skilled in the art that various changes and modifications may be made therein without departing from the scope of the invention as set forth in the appended claims.

The invention claimed is:

1. In combination, an oscillator tube including thermal means for controlling the oscillator frequency, a discriminator circuit responsive to a beat frequency between the aforementioned oscillator frequency and a signal, said discriminator circuit being tuned to a predetermined frequency to produce an output of one polarity if the beat frequency is above said predetermined frequency and of the opposite polarity if the beat frequency is below said predetermined frequency, a first trigger circuit including first and second electronic discharge devices for receiving the output of said discriminator circuit and arranged so that one of said electronic discharge devices conducts when the output of said discriminator circuit is of one polarity and the other of said electronic discharge devices conducts when the output of said discriminator is of the opposite polarity, thereby affording two stable regions of operation, a second trigger circuit including third and fourth electronic discharge devices for receiving the output of said first trigger circuit and arranged so that it has two stable regions of operation and shifts from one stable operating region to another each time said first trigger circuit changes between its two stable regions of operation, means for producing a pulse when said first trigger circuit remains in one stable region of operation for a predetermined period of time, means responsive to said pulse for rendering said first trigger circuit sensitive to a signal of a certain polarity from said discriminator circuit and for causing said second trigger circuit to change from one stable operating region to another, and means for controlling the frequency of said oscillator tube as a function of the output of said second trigger circuit.

2. In combination, an oscillator tube including thermal means for controlling the oscillator frequency, a discriminator circuit, responsive to a beat frequency between the aforementioned oscillator frequency and a signal, said discriminator circuit being tuned to a predetermined frequency to produce an output of one polarity if the beat frequency is above said predetermined frequency and of the opposite polarity if the beat frequency is below said predetermined frequency, a first trigger circuit including first and second electronic discharge devices for receiving the output of said discriminator circuit and arranged so that one of said electronic discharge devices conducts when the output of said discriminator circuit is of one polarity and the other of said electronic discharge devices conducts when the output of said discriminator is of the opposite polarity, thereby affording two stable regions of operation, a second trigger circuit including third and fourth electronic discharge devices for receiving the output of said first trigger circuit and arranged so that it has two stable regions of operation and shifts from one stable operating region to another each time said first trigger circuit changes between its two stable regions of operation, means responsive to continuous conduction for a predetermined time by either one of the electron discharge devices of the first trigger circuit for rendering said first trigger circuit sensitive to a signal from the discriminator circuit of a certain polarity and for causing said second trigger circuit to change from one stable region of operation to another, and means responsive to the output of the second trigger circuit for controlling the frequency of said oscillator tube.

3. In combination, a first means for producing a voltage output of one polarity in response to input voltages having frequencies below a predetermined value and producing a voltage output of the opposite polarity in response to input voltages having frequencies above said predetermined value, a first trigger circuit including first and second electronic discharge devices for receiving the output of said first means and arranged so that one of said electronic discharge devices is triggered into a conducting condition by an output voltage of said first means of one polarity and the other of said electronic discharge devices in triggered into a conducting condition by an output voltage of said first means of the opposite polarity, thereby affording two stable states of operation, a second trigger circuit including third and fourth electronic discharge devices for receiving the output of said first trigger circuit and said second trigger circuit being arranged so that it has two stable states of operation and shifts from one stable operating state to another to alternately produce first and second outputs each time said first trigger circuit changes between its two stable states of operation, means responsive to continuous conduction for a predetermined time by either one of the electron discharge devices of the first trigger circuit for rendering said first trigger circuit sensitive to a signal of a certain polarity from said first means and for causing said second trigger circuit to change from one stable operating state to another, an oscillator having frequency-varying means, and means connecting said second trigger circuit and said frequency-varying means for controlling the frequency variation of said oscillator in response to the output of said second trigger circuit.

4. In combination, a first means to produce a voltage output as a function of the frequency of an applied voltage in relation to a predetermined value, a second means connected to said first means and having two electron discharge devices which alternatively conduct as a function of the output voltage of said first means, a third means connected to said second means for producing an output voltage which alternatees between a first magnitude and a second magnitude in response to said second means changing from conduction by one electron discharge device to conduction by the other electron discharge device, an oscillator having frequency-varying means, and a fourth means connected between said third means and said frequency-varying means for increasing the frequency of said oscillator in response to an output voltage from said third means of said first magnitude and decreasing the frequency of said oscillator in response to an output voltage from the third means of said second magnitude, means responsive to continuous conduction for a predetermined time by either one of the said two electron discharge devices for rendering said second means sensitive only to a predetermined voltage output from said first means and for causing said third means to change its output voltage from said first magnitude to said second magnitude, to thereby reverse the direction in which the frequency of the oscillator is varied by the fourth means.

5. In combination, an oscillator tube including thermal means for controlling the oscillator frequency, a discriminator circuit responsive to a beat frequency between said oscillator frequency and a signal, said discriminator circuit being tuned to a predetermined frequency to produce an output voltage of one polarity if the beat frequency is above said predetermined frequency and to produce an output voltage of the opposite polarity if the beat frequency is below the said predetermined frequency, a first multivibrator circuit having two stable states of operation, means for connecting said first multivibrator circuit to said discriminator circuit so that said multivibrator circuit is triggered into one of said stable states by output voltages from said discriminator of one polarity and said multivibrator circuit is triggered into its other stable state of operation by output voltages from said discriminator of the opposite polarity, a second multivibrator circuit having two stable states of operation and connected to said first multivibrator so that said second multivibrator circuit is triggered from one of its stable states of operation to the other in response to each output pulse of the first multivibrator circuit, means responsive to the output of the second multivibrator circuit for controlling the current through said thermal means of said oscillator tube so that the oscillator frequency increases when the second multivibrator corcuit is in one of its stable states of operation and said oscillator frequency decreases when said second multivibrator circuit is in its other stable state of operation, and means responsive to continuous operation of said first multivibrator circuit in either one of its stable states for a predetermined period for triggering said second multivibrator circuit to thereby reverse the direction of variation of the oscillator frequency and for conditioning the first multivibrator circuit to render it sensitive to triggering by a voltage of a given polarity from said discriminator circuit.

GEORGE H. NIBBE.

REFERENCES CITED

The following references are of record in the file of this patent:

UNITED STATES PATENTS

| Number | Name | Date |
|---|---|---|
| 2,198,248 | Hansell | Apr. 23, 1940 |
| 2,211,750 | Humby et al. | Aug. 20, 1940 |
| 2,266,401 | Reeves | Dec. 16, 1941 |
| 2,267,453 | Foster | Dec. 23, 1941 |
| 2,390,608 | Miller et al. | Dec. 11, 1945 |